Sept. 30, 1969 F. ULRICH 3,470,534

MAGNETIC CORE MATRIX ARRANGEMENT FOR THE INDIVIDUAL RECEPTION OF MARKS

Filed Oct. 15, 1965 2 Sheets-Sheet 2

United States Patent Office 3,470,534
Patented Sept. 30, 1969

3,470,534

MAGNETIC CORE MATRIX ARRANGEMENT FOR THE INDIVIDUAL RECEPTION OF MARKS

Friedrich Ulrich, Stuttgart-Weilimdorf, Germany, assignor to International Standard Electric Corporation, New York, N.Y., a corporation of Delaware Filed Oct. 15, 1965, Ser. No. 496,341
Claims priority, application Germany, Oct. 20, 1964, St 22,836
Int. Cl. H04q 1/02
U.S. Cl. 340—166 3 Claims

ABSTRACT OF THE DISCLOSURE

A circuit arrangement for the individual reception of marks. The arrangement comprises a plurality of marking means. Marking leads extending from the marking means are threaded through pairs of magnetic cores in an encoded distribution. A counter interrogates the magnetic cores by sequentially magnetizing different combinations of the individual ones of the pairs of cores to determine which of the marking leads is marked. Due to the magnetization of the cores by the counter, only one of the leads that extend from the marking means is not blocked for each position of the counter. All of the leads are coupled together on the side of the cores opposite the marking means and connected to a common indicator. When a lead is marked, that is not blocked, the common indicator provides a signal to equipment for providing the counter position.

Figure 1:
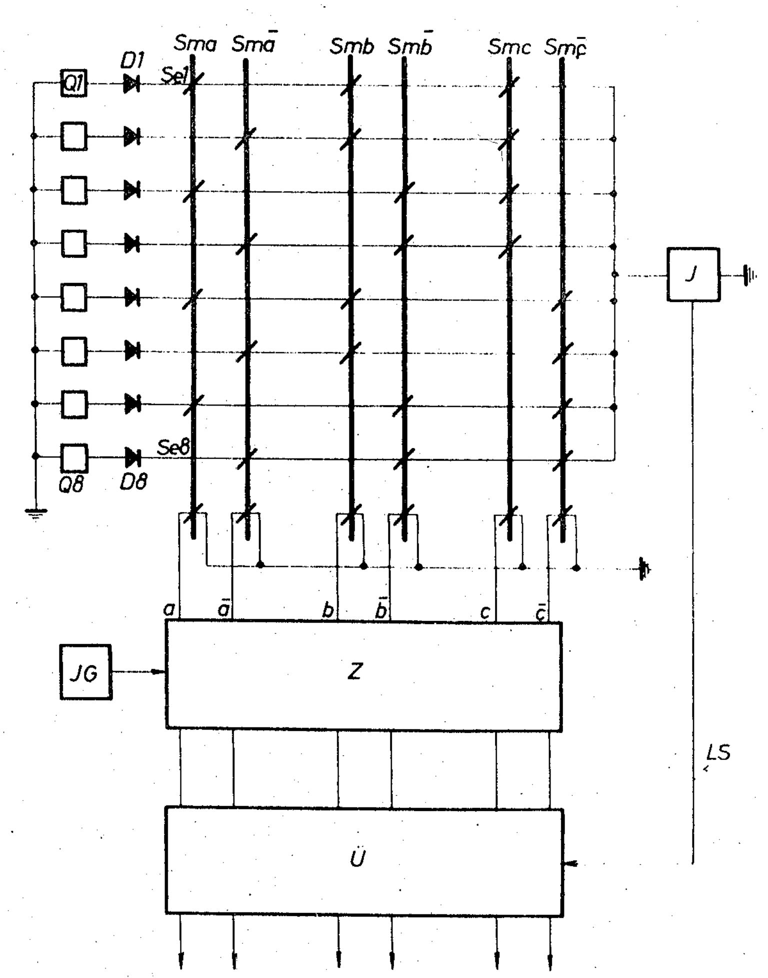

The present invention relates to marking signals receiver circuits and more particularly, a circuit arrangements for the individual reception of marks in data processing and telephone switching systems.

Marking signal or mark receiver circuit arrangements are known in which, in a cyclical succession, via magnetic elements, a portion of the marking inputs is blocks, or in which, via the magnetic latching, only one input at a time is released for interrogation. In these circuit arrangements, however, linear scanning is used for the sensing or scanning of information sources. The scanning is accomplished using AND-circuits, e.g., a magnetic AND-circuit, which are individually assigned to each information source. Each AND-circuit is operated by a coincidence between a signal from a selecting device (for example a cyclical pulse distributor) and a signal from the information source. All of the outputs of these logical AND-circuits are combined in one OR-circuit. Signals are transmitted in a predetermined order of succession to selecting leads. If a mark is produced by an information source then a signal will occur at the output of the OR-circuit if the selecting lead of the associated AND-circuit conducts a signal.

The order of succession of the selecting signals is controlled by a rotating counter. In the presence of an output signal from the OR-circuit it is thus possible, via the respective status of the counter, to ascertain the identification of the marked information source. Although the logical circuits assigned to the information sources, can be equipped in a relatively inexpensive way with magnetic elements, and although these may be controlled in coincidence, the total expenditure is still a rather considerable one on account of the decoding of the counter-status information which normally exists in binary form, and which is necessary for the selecting purpose, and because of the required through-connecting means.

It is the object of the present invention to reduce the required expenditure. The circuit arrangement according to the invention solves this problem in that the marking leads are looped preferably in a binary-encoded distribution and contradictorily through a common group of magnetic cores and are connected to one common indicator. Also in that the blocking of the marking leads which are not being interrogated, is effected in the encoded form via a counter and the magnetic cores, and further in that the indicator is connected via a control lead, to a transmission equipment which, upon arrival of a marking signal (mark) will transmit the respective counter status information.

In this way the expenditure on magnetic cores and decoupling diodes is reduced to a minimum, and in the case of a binary-encoded distribution of the input leads only $2n$ magnetic cores are required for $2^n$ inputs.

In a simple way the circuit arrangement may be matched for passive information sources. For example, as a marking sign, a switch may be closed in the input lead. In the event of a closed switch, the interrogated lead will then transmit $n$ pulse from an additional magnetic core which is common to all inputs, to the indicator.

Figure 2:
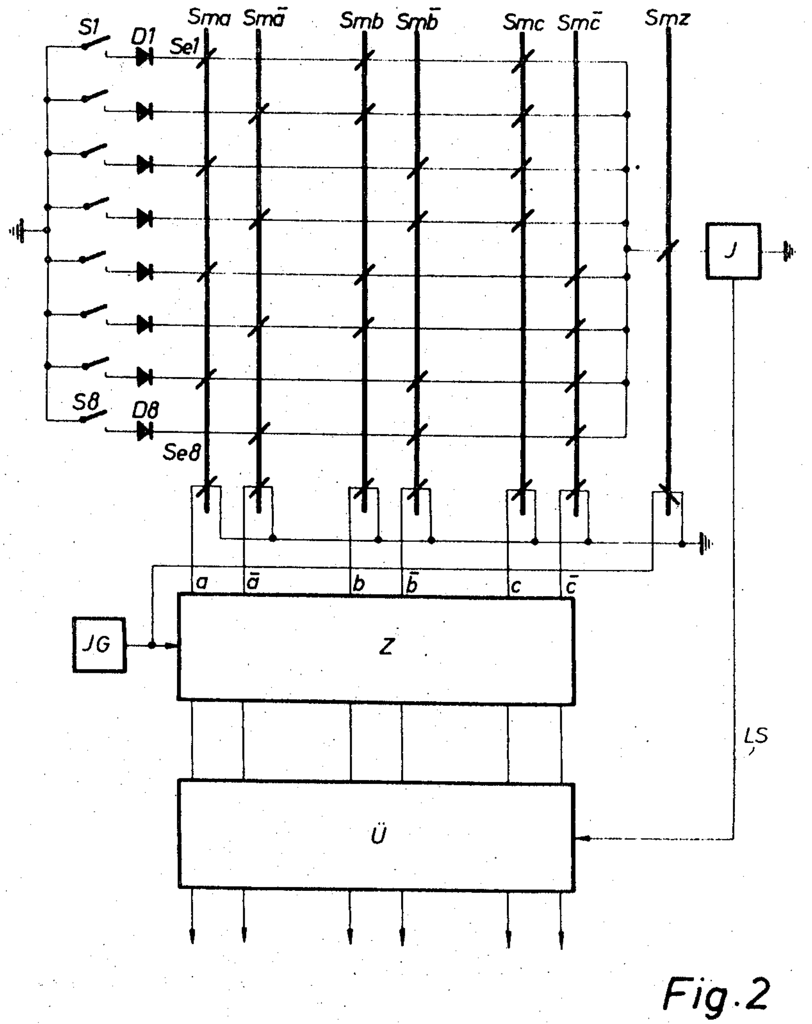

The invention will now be explained in detail with reference to the copending drawings; wherein:

FIG. 1 shows in block diagram and schematic form one embodiment of the invention circuit arrangement; and FIG. 2 shows in block diagram and schematic form a modified version of the arrangement of FIG. 1.

In FIG. 1 there is shown an embodiment comprising only eight inputs, in which the information sources Q1 through Q8, via the decoupling diodes D1 through D8, transmit positive pulses as marks to the electrical input leads S*e*1 through S*e*8. The input leads are looped in a binary-encoded distribution and contradictorily through the magnetic cores S*ma*, S*m*$\bar{a}$ . . . to S*mc*, S*m*$\bar{c}$, with the neighbouring pairs of cores (e.g. S*mc*, S*m*$\bar{c}$) being threaded contradictorily. The input leads are terminated by a common indicator J. The binary counter Z is continuously stepped on by the pulse generator JG. Each step of the binary counter is looped with the two contradictory outputs (e.g., $a$ and $\bar{a}$) into one pair of the magnetic cores. Via these loops, in every position of the counter, three of the magnetic cores will receive positive inhibiting pulses, by which each time all input leads with the exception of one are blocked, so that they are incapable of transmitting marking pulses to the indicator. If the one non-inhibited lead, hence the one which is just being interrogated, conducts an impulse of the information source assigned thereto, then this pulse will be fed to the common indicator J. Thereupon the indicator will cause that the respective status of the counter, via the transmission equipment U, is retained for the purpose of identifying the recognized input mark, and for the evaluation thereof.

In FIG. 2 as information sources there are used the switches S1 through S8. For the marking of an input the respective switch is closed. In extending the just described circuit according to FIG. 1, the circuit shown in FIG. 2 comprises an additional magnetic core S*mz* to which positive pulses are transmitted by the pulse generator JG. If the switch, e.g., S1, of the just non-inhibited input lead, e.g., S*e*1, is closed then the pulse is transmitted to the indicator. If the switch is opened no pulse is transmitted, because all other diodes are positively biased, and because the current is prevented from flowing. All non-described parts of FIG. 2 are in agreement with those of the circuit according to FIG. 1.

What is claimed is:

1. A circuit arrangement enabling the individual reception and identification of marks, said arrangement comprising a plurality of marking sources, a plurality of electrical input leads, there being one input lead for each one of said plurality of marking sources, diode means for coupling said electrical input leads to the individual marking source, common indicator means operated responsive to the receipt of a mark on any of said input leads for generating a signal, a plurality of pairs of magnetic cores, each of said input leads being threaded through only one of the magnetic cores of said pairs of cores in a binary encoded distribution, said input leads being connected together after passing through the cores, said common indicator means being coupled to said input leads where said input leads are connected together, binary counter means, pairs of output leads from said binary counter means individually coupled through individual ones of said pairs of cores, said binary counter means providing binary signals to said pairs of output leads so that a magnetizing signal is transmitted to only one of said pairs of cores at a time, transmission equipment coupled to said binary counter, means for coupling the signal from said common indicator to said transmission equipment for causing said transmission equipment to record the position of said binary counter upon receipt of said signal.

2. A circuit arrangement according to claim 1 wherein said marking means actively provides a signal for the marking.

3. A circuit arrangement according to claim 1 wherein said marking means is dormant, said marking means comprising a switch in a normally open position, and wherein said marking is obtained when said switch is closed, and further wherein said marking is obtained through a single core, output lead means connected to the connection of said input leads, and coupled to the input of said common indicator, pulse generator means for driving said counter, and means for contradictorily magnetizing said individual magnetic core responsive to the pulses from said pulse generator means.

References Cited

UNITED STATES PATENTS

| | | |
|---|---|---|
| 2,931,022 | 3/1960 | Triest. |
| 3,069,658 | 12/1962 | Kramskoy. |
| 3,142,049 | 7/1964 | Crawford. |
| 3,312,785 | 4/1967 | Fujinaka. |

JOHN W. CALDWELL, Primary Examiner

H. I. PITTS, Assistant Examiner

U.S. Cl. X.R.

340—167, 168, 174